March 30, 1943. W. E. SMITH 2,315,358
ELECTRIC METALLIC ARC WELDING
Filed Oct. 19, 1940
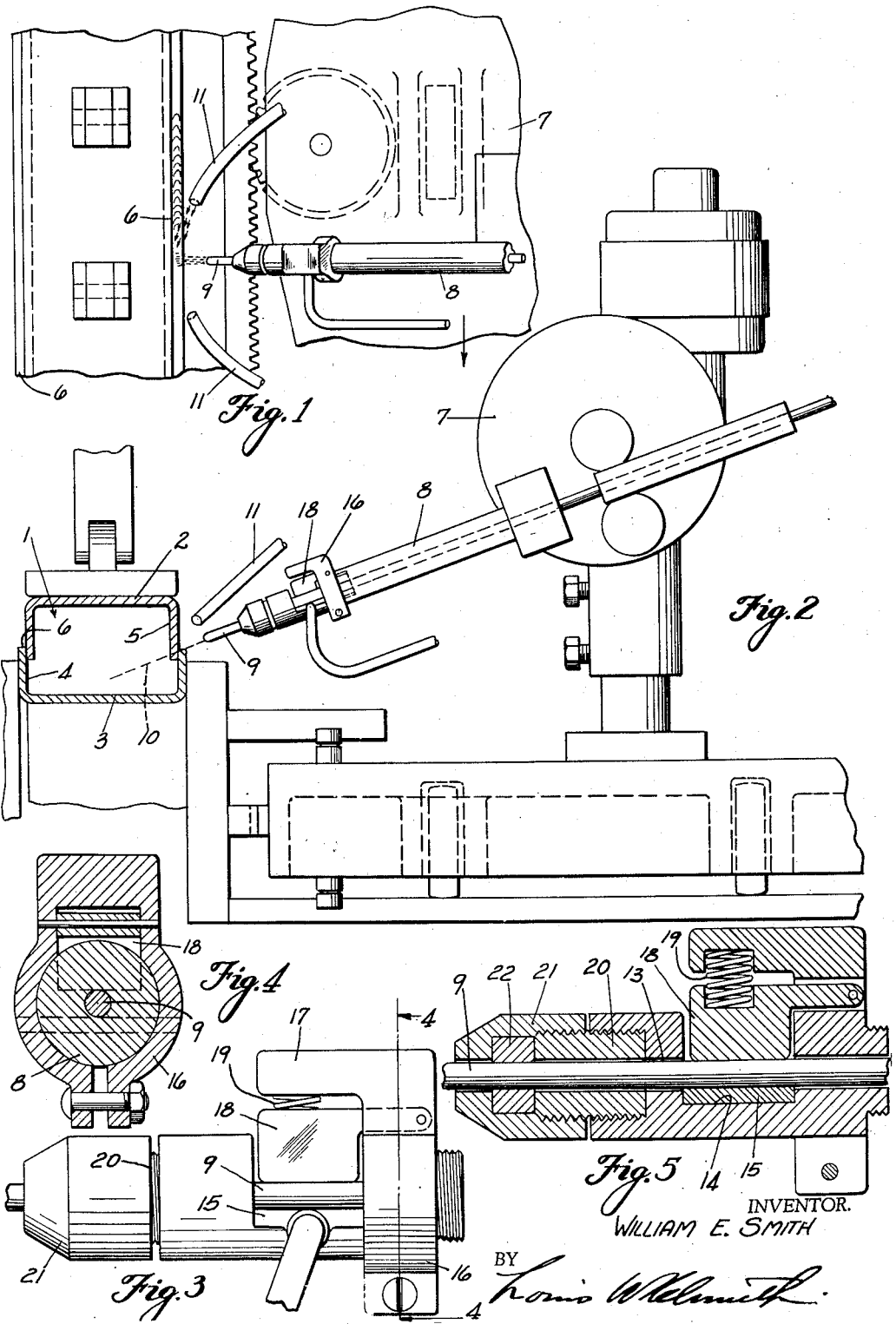
INVENTOR.
WILLIAM E. SMITH
BY Patented Mar. 30, 1943

2,315,358

UNITED STATES PATENT OFFICE 2,315,358

ELECTRIC METALLIC ARC WELDING

William E. Smith, Detroit, Mich., assignor to The Midland Steel Products Company, Cleveland, Ohio, a corporation of Ohio Application October 19, 1940, Serial No. 361,919

10 Claims. (Cl. 219—10)

This invention relates to new and useful improvements in electric metallic arc welding, in which the metal of the electrode is fused by the arc struck between it and the work to deposit the fused metal in a continuous seam being welded. The greatest speed heretofore achieved with this type of welding was approximately 90 inches per minute.

An important object of the invention is to increase the speed of metallic arc welding to 140 or more inches per minute with a commercially satisfactory continuous weld laid in the seam.

Other objects and advantages of the invention will become apparent during the course of the following description.

Referring now to the drawing forming a part of the description and wherein like numerals are employed to designate like parts throughout the various views, Fig. 1 is a plan of a seam being welded with the relative arrangement of parts of the welding apparatus in operative position to the seam, Fig. 2 is a transverse section of the same, Fig. 3 is a side elevation of my improved welding nozzle for the feed of the fusible electrode, Fig. 4 is a transverse section of the same taken on the line 4—4 of Fig. 3, Fig. 5 is a longitudinal section of the welding nozzle with the fusible electrode disposed in operative relation thereto.

Referring now more particularly to the drawing for further details and wherein one example of the invention is illustrated, the numeral 1 designates a piece of work which is to be welded with longitudinally extending continuous seams. The work in this instance is a box section side rail for an automobile frame having the usual offset or kickup portions and is composed of a length of light gauge inverted channel section 2 nested within a second light gauge channel section 3, disposed with its flanges 4 lapped over the flanges 5 of the inverted section to form a closed box section having lapped joints 6 on opposite sides arranged in vertical planes. In this type of joint, a V-shaped notch is formed by the relation of the lapped edges. While other forms of joints may be welded with the present invention, the foregoing difficult type is illustrated to accentuate the advantages of the invention.

The work is firmly clamped and held stationary in a jig with the overlapped edges 6 vertical to assist in preventing any distortion thereof due to the heat imparted thereto during the welding operation.

An automatic metallic arc welding head 7 of the well known type is provided with a guide tube 8 through which a flux dust coated fusible welding wire electrode 9 is continuously fed during welding by the usual driven feed rollers on such heads. Alternating electric current of an intensity of 50 volts and 700 amperes is conducted to the electrode near its arcing end by a suitable conductor lead. This is far in excess of the rate of electrical energy heretofore used for metallic arc welding, and was necessary to increase the rate of production to meet schedule. In order to insure the uniform conduct of electrical energy into the electrode at a point adjacent its arcing end, the guide tube 8 is formed with a longitudinal bore 13 through which the electrode is fed, and a seat 14 for a bronze contact block 15 which has one face substantially tangent to the bore 13 over which the electrode is slid during its feeding movement. This contact block is located as close to the arcing end of the electrode as is mechanically possible. A clamp 16 is secured to the tube 8 and has a portion 17 which overlies the block 15. A contact lever 18 is fulcrumed at one end to the clamp and its relatively broad free end is pressed firmly down upon the electrode by a coiled spring 19. The electrode is thus forced into good electrical contact with the contact block 15 over a large area.

The forward end of the tube 8 is provided with a threaded recess in which is screwed one end of an externally threaded plug 20 having a longitudinal passage. The other end of the plug is threaded into a tip 21 having a hardened washer 22 held therein against a shoulder by the plug. This washer has a central guide aperture through which the electrode is fed to take the wear off of the passage through tip 21. The electrode wire is somewhat knurled as usual and acts like a file on any surface it contacts, so that without the washer 22, the passage through the tip would be worn eccentric and the wire would not be guided to the proper point of arcing, resulting in an unstable arc.

The guide tube 8 is arranged substantially normal to the joint to be welded in downwardly inclined relation pointing toward the V-shaped crevice of the joint at an angle of about 20 degrees to a horizontal plane through the work. The wire electrode 9 is preferably directed with its axis so that the arc drawn between the same and the grounded work, will cut or melt through the inner corner edge of the flange 4 and the outer surface of flange 5 at an angle of about 20 degrees to the horizontal along the dotted line 10, to pool or puddle the metal in a somewhat U-shaped crevice. Thus, a crevice or gutter, with steeper side walls is provided for the support or pooling of the molten metal from both the edges of the work and the fusible electrode.

In addition to the inclination of the electrode to the horizontal, it may also be inclined forwardly of the direction of movement of the welding head 7 with respect to the joint, so that the arc will have the effect of pre-heating the joint immediately in advance of the point where the metal edges are welded. If it is not desired to give the electrode this second or forward inclination, a separate pre-heating torch, not shown, may be run along the joint in advance of the electrode to pre-heat the joint for the final heating thereof by the arc and the deposit of the electrode material in the seam. However, the use of a pre-heating torch has not been found necessary to achieve the exceptionally high speeds of welding attained, but may be used to effect a weld of smoother appearance.

Having thus established the relation of the work and electrode, either may be moved longitudinally of the other to cause the electrode to speedily weld the work along a continuous seam extending lengthwise of the work, without causing warpage thereof. This means of course, that the welding heat must be very intense for a very short interval of time over a small strip or area confined to the seam, especially due to the danger of burning through the light gauge work and the danger of warpage. With these hazards and the demand for higher speeds, it was impossible to hold the fused metal on the seam, which resulted in inferior welding. To overcome this faulty operation, a stream of cooling air or gas was flowed at a controlled rate on the molten seam immediately as it was laid. This probably has the effect of equalizing the temperatures of the globules of electrode material and the seam edges to cause a more rapid consolidation or freezing of the molten metal.

To accomplish this holding and freezing of the molten metal in the seam, a nozzle 11 is associated with the welding head 7 to move therewith and is inclined down toward the seam to direct a flow or stream of cooling medium, such as cool air from a suitable source on and behind the weld being made. In other words, this nozzle 11 is arranged to trail or follow the electrode guide tube 8 along the seam with its discharge end arranged about two inches from the end of the electrode and the weld being laid in the seam. The temperature and rate of flow of the cooling medium from the nozzle is regulated to be slow whereby the medium cools and checks super-fluidity of the fused electrode material without having any detrimental effect upon the weld. This cooling medium may be air, nitrogen or other gas or combinations thereof to also serve as a cloak or blanket for enclosing the welding zone to reduce splatter and to maintain the weld in a non-oxidizing and quiescent state.

In cases where the welding head welds on both advance and return strokes of the head or work, depending whichever is moved relative to the other, a pair of these nozzles 11 are provided, one on each side of the electrodes, so that one serves to flow air behind the weld on the advance stroke, and the other nozzle operates to flow air on the return stroke. A separate welding head is provided to weld each longitudinal joint, and if desired, a pair of welding heads may be used on each joint as a relay team; with both heads moving simultaneously in the same direction, whereby one finishes welding its part of the joint, where the other head began.

In this type of welding in which the fusible electrode forms one pole of the circuit and the work forms the other pole, the light gauge work being welded is rapidly reduced to a molten state along a line where the arc impinges, for about one-third to one-half the thickness of the stock due to the speed at which the welding occurs. In practice, the speed of 140 lineal inches per minute has been achieved with this apparatus to date. By immediately cooling the molten metal of the edges and that which is deposited from the fusible electrode, with a stream of cooling gas under pressure, the molten metal is frozen instantly as it impinges the seam and the heat strip or area which has been heated by the high potential arc, is reduced to the very minimum width, thereby retarding any tendency toward warpage of the work. Also, due to the intensity of the attack of the arc upon the cold metal, considerable flash splattering of the fused metal would ordinarily occur but this is materially minimized by the pressure stream of cooling medium causing an immediate freezing of the molten fusible electrode metal as soon as it impinges and combines with the heated edges of the work. Due to the comparative volume of metal in the work piece and the electrode, it is obvious that the electrode will be reduced to a molten state quicker than the work piece. However, in order to weld at the increased speed of 140 inches per minute, it is necessary that the value of electrical current be such as to melt the work edges at this speed. Due to the smaller volume of electrode material operating under the same high electrical heat, it became fused much quicker than the work piece which meant that the temperature of the fused electrode globules falling upon the work would be at a much higher temperature than the work piece so that when these globules impinged the work piece, it was much like a drop of water upon a hot stove lid thereby causing the globules to erupt and splatter to produce an unsatisfactory weld. Therefore, contrary to former practice, the stream of cool atmospheric air upon the seam crater is believed to have somewhat of a Bessemer effect of increasing the temperature of the molten seam edges to facilitate incorporation or consolidation of the fused electrode globules with the molten metal of the seam and thereby cause a higher degree of both mechanical and metallurgical interlocking of the two fused metals without excessive splatter.

It will be understood that various changes in the speed of welding and the arrangement of parts may be resorted to without departing from the spirit of the appended claims.

I claim:

1. The step in metallic arc welding with a fusible electrode consisting of directing a stream of oxidizing atmosphere across the arc stream and downwardly and forwardly toward the seam in the direction in which the welding of the seam proceeds.

2. The method of metallic arc welding consisting of progressively depositing fused electrode material upon a seam to be united, and instantly freezing the fused electrode material as it is deposited upon said seam by directing a stream of cool atmospheric air upon the fused electrode material as it impinges the seam.

3. The method of metallic arc welding consisting of creating an arc between a fusible metallic electrode and a work piece having a seam while relatively moving the same to fuse the joint and deposit molten metal from the electrode therein to weld at a rate in excess of 130 inches per minute, and directing a stream of atmospheric air into the arc stream and downwardly and forwardly toward the seam in the direction in which the welding of the seam proceeds.

4. The method of metallic arc welding consisting of creating an arc between a fusible metallic electrode and a work piece having a seam while relatively moving the same to fuse the joint and deposit molten metal from the electrode therein to weld at a rate in excess of 130 inches per minute, and directing a stream of atmospheric air into the arc stream and downwardly and forwardly toward the seam in the direction in which the welding of the seam proceeds, whereby both the fused globules of electrode in transit and the fused edges of the work receive the effect of an oxidizing atmosphere and are rendered approximately the same temperature.

5. The method of metallic arc welding consisting of creating an electric arc with alternating current in excess of 600 amperes and 40 volts between a fusible electrode and a work piece having a joint while relatively moving the same to fuse the joint and deposit molten metal from the electrode therein to weld at a rate in excess of 130 inches per minute, and directing a stream of atmospheric air into the arc stream and downwardly and forwardly toward the seam in the direction in which the welding of the seam proceeds.

6. The method of electric arc welding consisting of creating an arc between a fusible electrode and a seam with sufficient current to burn holes through the seam unless traversed at a speed in excess of 110 inches per minute, and directing a stream of cool air into the arc stream and in a direction down toward said seam upon the fused globules of electrode in their passage toward the seam to lower the temperature of the globules and to cause them to consolidate and freeze in the molten seam immediately as they are deposited therein without excessive splatter.

7. The method of metallic arc welding consisting of creating an arc with alternating electric current of approximately 40 volts and 500 amperes between a fusible electrode and a seam while relatively moving the same and feeding the electrode toward the seam to weld the same at a rate faster than heretofore possible and in excess of 130 inches per minute, and directing a stream of cool atmospheric air into the arc stream and in a direction down toward said seam upon the fused globules of electrode in their passage toward the seam to lower the temperature of said globules in transit and to cause them to approximately equal the temperature of the molten seam to freeze in the seam immediately as they strike the same without excessive splatter.

8. The method of metallic arc welding consisting of creating an arc between a fusible metallic electrode and a work piece having a seam while relatively moving the same to fuse the seam and deposit molten metal from the electrode therein to weld at a rate in excess of 100 inches per minute, and directing a stream of atmospheric air into the crater in the seam created by the arc to provide somewhat the effect of a Bessemer action in the metal therein to raise the temperature thereof to that of the molten electrode material to assure instantaneous consolidation thereof with the molten seam metal.

9. The method of metallic arc welding consisting of creating an arc between a fusible metallic electrode and a seam with sufficient electrical current to burn holes through the seam unless traversed at a speed in excess of 100 inches per minute, and directing a stream of atmospheric air into the arc crater in the seam which is of greater volume than the electrode to increase the temperature of the molten metal in the seam to substantially equalize with the temperature of the molten electrode globules whereby welding of the same can be conducted at a rate in excess of 130 inches per minute.

10. The method of metallic arc welding consisting of creating an arc of alternating current at a rate of at least 500 amperes and 40 volts between a fusible metallic electrode and a work seam and relatively moving the electrode and work to weld at a rate in excess of 130 inches per minute, and directing a stream of atmospheric air in the direction of welding diagonally through the arc stream and into the molten metal of the seam to increase its temperature to approximately that of the molten electrode material to assure consolidation thereof with the molten seam metal.

WILLIAM E. SMITH